United States Patent
Chen et al.

(10) Patent No.: US 10,374,807 B2
(45) Date of Patent: Aug. 6, 2019

(54) STORING AND RETRIEVING CIPHERTEXT IN DATA STORAGE

(71) Applicant: HEWLETT PACKARD ENTERPRISE DEVELOPMENT LP, Houston, TX (US)

(72) Inventors: Liqun Chen, Bristol (GB); Peter T. Camble, Bristol (GB); Jonathan P. Buckingham, Bristol (GB); Simon Pelly, Bristol (GB); Simon Kai-Ying Shiu, Bristol (GB); Joseph S. Ficara, Southborough, MA (US); Hendrik Radon, Boeblingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 53 days.

(21) Appl. No.: 15/114,921

(22) PCT Filed: Apr. 4, 2014

(86) PCT No.: PCT/US2014/032920
§ 371 (c)(1),
(2) Date: Jul. 28, 2016

(87) PCT Pub. No.: WO2015/152935
PCT Pub. Date: Oct. 8, 2015

(65) Prior Publication Data
US 2016/0344553 A1    Nov. 24, 2016

(51) Int. Cl.
*H04L 9/32* (2006.01)
*G06F 16/27* (2019.01)
(Continued)

(52) U.S. Cl.
CPC ........ *H04L 9/3242* (2013.01); *G06F 11/1453* (2013.01); *G06F 16/2365* (2019.01);
(Continued)

(58) Field of Classification Search
CPC ...... H04L 9/3242; H04L 9/0894; G06F 11/14; G06F 17/30371; G06F 17/30584; G06F 21/602; G06F 21/79
See application file for complete search history.

(56) References Cited

U.S. PATENT DOCUMENTS

| 4,924,515 A | 5/1990 | Matyas et al. |
| 5,764,766 A | 6/1998 | Spratte |
| (Continued) | | |

FOREIGN PATENT DOCUMENTS

| KR | 20110071717 A | 6/2011 |
| WO | WO-2013159582 A1 | 10/2013 |

OTHER PUBLICATIONS

Kiatchumpol Suttisirikul et al., "Accelerating the Cloud Backup using GPU based Data Deduplication,", 2012, EEE Computer Society, pp. 766-769. (Year: 2012).*

(Continued)

*Primary Examiner* — Luu T Pham
*Assistant Examiner* — Canh Le
(74) *Attorney, Agent, or Firm* — Brooks, Cameron & Huebsch, PLLC

(57) ABSTRACT

Storing and retrieving ciphertext in data storage can include determining a first ciphertext value for a first data chunk to be saved to a client-server data storage system using an encrypted chunk hash value associated with the first data chunk as an initial value, and storing the first data chunk on a server in the client-server data storage system in response to determining that the first ciphertext value is a unique ciphertext value. Also, storing and retrieving ciphertext in data storage can include decrypting a ciphertext value for a second data chunk received from a client in the client-server data storage system and based on an encrypted chunk hash value associated with the second data chunk, and sending the second data chunk to the client in response to determining
(Continued)

that the decrypted ciphertext value corresponds to an original data chunk saved to the server by the client.

16 Claims, 4 Drawing Sheets

(51) Int. Cl.
*G06F 16/23* (2019.01)
*G06F 21/79* (2013.01)
*H04L 9/08* (2006.01)
*G06F 21/60* (2013.01)
*G06F 11/14* (2006.01)

(52) U.S. Cl.
CPC .......... *G06F 16/278* (2019.01); *G06F 21/602* (2013.01); *G06F 21/79* (2013.01); *H04L 9/0894* (2013.01); *G06F 2201/83* (2013.01); *G06F 2221/2107* (2013.01)

(56) References Cited

U.S. PATENT DOCUMENTS

| | | |
|---|---|---|
| 8,199,911 B1 | 6/2012 | Tsaur et al. |
| 8,219,821 B2 | 7/2012 | Zimmels et al. |
| 8,266,430 B1 | 9/2012 | Lumb |
| 8,281,143 B1 | 10/2012 | Clifford et al. |
| 8,479,304 B1 | 7/2013 | Clifford |
| 8,495,392 B1 | 7/2013 | Bardale |
| 8,731,190 B2 | 5/2014 | Lumb |
| 9,086,819 B2 | 7/2015 | Panchbudhe et al. |
| 9,152,500 B1 | 10/2015 | Gardner |
| 9,225,691 B1 | 12/2015 | Balasubramanian et al. |
| 2007/0150755 A1 | 6/2007 | Makii et al. |
| 2008/0270436 A1* | 10/2008 | Fineberg ............ G06F 17/30097 |
| 2011/0016095 A1 | 1/2011 | Anglin et al. |
| 2011/0022718 A1 | 1/2011 | Evans et al. |
| 2012/0158672 A1* | 6/2012 | Oltean ................. G06F 16/13 707/692 |
| 2012/0166448 A1* | 6/2012 | Li ..................... G06F 16/137 707/747 |
| 2012/0204024 A1* | 8/2012 | Augenstein ......... G06F 11/1453 713/150 |
| 2012/0290537 A1* | 11/2012 | Smith ................... G06F 3/0608 707/654 |
| 2013/0054524 A1* | 2/2013 | Anglin .................. G06F 16/27 707/624 |
| 2013/0054545 A1* | 2/2013 | Anglin ................. G06F 3/0608 707/693 |
| 2013/0103945 A1* | 4/2013 | Cannon .............. G06F 21/6209 713/168 |
| 2013/0138620 A1* | 5/2013 | Yakushev ........... G06F 16/1752 707/698 |
| 2013/0166510 A1 | 6/2013 | Augenstein et al. |
| 2013/0254537 A1 | 9/2013 | Bogorad |
| 2013/0305039 A1 | 11/2013 | Gauda et al. |
| 2014/0025948 A1 | 1/2014 | Bestler et al. |
| 2014/0032925 A1 | 1/2014 | Panchbudhe et al. |
| 2014/0040616 A1 | 2/2014 | Barber et al. |
| 2014/0189348 A1* | 7/2014 | El-Shimi ............. G06F 21/6218 713/165 |
| 2014/0304526 A1 | 10/2014 | Grube et al. |
| 2015/0156174 A1* | 6/2015 | Fahey ................. H04L 63/0428 713/168 |
| 2016/0065540 A1 | 3/2016 | Androulaki et al. |
| 2016/0077977 A1 | 3/2016 | Narayanamurthy |
| 2016/0291891 A1 | 10/2016 | Cheriton et al. |
| 2016/0352511 A1 | 12/2016 | Bashyam et al. |
| 2017/0288861 A1 | 10/2017 | Matthews |

OTHER PUBLICATIONS

Laura DuBois et al., "Backup and Recovery: Accelerating Efficient and Driving Down IT Costs Using Data Deduplication," Feb. 2010, pp. 1-13. (Year: 2010).*
Floyd, J., "Deduplication and Encryption," (Web Page), Permabit, Aug. 28, 2009, 4 pages, available at http://permabit.com/deduplication-and-encryption/.
International Search Report & Written Opinion received in PCT Application No. PCT/US2015/013761, dated Oct. 29, 2015, 9 pages.
Jin, X et al., "Anonymous Deduplicaton of Encrypted Data with Proof of Ownership in Cloud Storage," (Research Paper), Aug. 12-14, 2013, 6 pages, available at http://ieeexplore.ieee.org/xpl/login.jsp?tp=&arnumber=6671119&url=http%3A%2F%2Fieeexplore.ieee.org%2Fxpls%2Fabs_all.jsp%3Farnumber%3D6671119.
International Search Report & Written Opinion received in PCT Application No. PCT/US2014/032920, dated Nov. 28, 2014, 10 pages.
Rashid, F. et al., "A Secure Data Deduplication Framework for Cloud Environments," (Research Paper), Privacy, Security and Trust (PST), 2012 Tenth Annual International Conference on, Jul. 16-18, 2012, pp. 81-87, available at http://ieeexplore.ieee.org/stamp/stamp.jsp?arnumber=6297923.
Storer, M.W. et al., "Secure Data Deduplication," (Research Paper), Proceedings of the 4th ACM International Workshop on Storage Security and Survivability, Oct. 31, 2008, 10 pages, available at http://www.ssrc.ucsc.edu/Papers/storer-storagess08.pdf.
Xu, J. et al., "Leakage-resilient Client-side Deduplication of Encrypted Data in Cloud Storage," (Research Paper), IACR ePrint Archive, Aug. 23, 2012, 15 pages, available at http://eprint.iacr.org/2011/538.pdf.
Bellare et al., "Message-Locked Encryption and Secure Deduplication," Mar. 2013, <https://eprint.iacr.org/2012/631.pdf>.
ISO, Abstract of "Information technology—Security techniques—Hash-functions—Part 3: Dedicated hash-functions," 2013, ISO/IEC 10118-3:2004, <http://www.iso.org/iso/catalogue_ detail.htm?csnumber=39876>.
Jaspreet Singh, "Encryption, Deduplication and Making Sense," Mar. 10, 2012, Druva Blog, <http://www.druva.com/blog/encryption-deduplication-making-sense/>.
Jered Floyd, "Deduplication and Encryption," Aug. 28, 2009, <http://permabit.com/deduplication-and-encryption/>.
Margaret Rouse, "data deduplication (intelligent compression or single-instance storage)," Jul. 26, 2010, <http://searchstorage.techtarget.com/definition/data-deduplication>.
Mattokeefe, "Does encryption play well with deduplication?," Feb. 26, 2010, <http://community.netapp.com/t5/Data-ONTAP-Discussions/Does-encryption-play-well-with-deduplication/td-p/20455>.
Pasquale Puzio, "ClouDedup: Secure Deduplication with Encrypted Data for Cloud Storage," Dec. 10, 2013, <https://elastic-security.com/2013/12/10/cloudedup-secure-deduplication/>.
Pasquale Puzio, "ClouDedup: Secure Deduplication with Encrypted Data for Cloud Storage," Dec. 3, 2013, IEEE CloudCom 2013, <http://www.slideshare.net/PasqualePuzio/cloudedup-cloudcom-2013-final-3>.
Perttula et al., "Drew Perttula and Attacks on Convergent Encryption," Mar. 20, 2008, Hack Tahoe-LAFS!, <https://tahoe-lafs.org/hacktahoelafs/drew_perttula.html>.
Scott Pack et al., "Deduplication of Encrypted Files," Jul. 24, 2013, <http://security.stackexchange.com/questions/39449/deduplication-of-encrypted-files>.
StackExchange, "What is the main difference between a key, an IV and a nonce?," Oct. 5, 2012, <http://crypto.stackexchange.com/questions/3965/what-is-the-main-difference-between-a-key-an-iv-and-a-nonce>.
StackOverflow, "Key salt and initial value AES," Jan. 1, 2012, <http://stackoverflow.com/questions/8692204/key-salt-and-initial-value-aes>.
Stephen Foskett, "Compression, Encryption, Deduplication, and Replication: Strange Bedfellows," Feb. 5, 2009, <http://blog.fosketts.net/2009/02/05/compression-encryption-deduplication-replication/>.

(56) References Cited

OTHER PUBLICATIONS

Stephen J. Bigelow, "Compression, deduplication and encryption: What's the difference?," May 23, 2006, <http://searchdatabackup.techtarget.com/tip/Compression-deduplication-and-encryption-Whats-the-difference>.
Wikipedia, "Convergent encryption," Apr. 3, 2016, <https://en.wikipedia.org/w/index.php?title=Convergent_encryption&oldid=602636597>.
Wikipedia, "Initialization vector," Dec. 29, 2013, <https://en.wikipedia.org/w/index.php?title=Initialization_vector&oldid=588189059>.

* cited by examiner

STORING AND RETRIEVING CIPHERTEXT IN DATA STORAGE

BACKGROUND

Information technology organizations are facing issues of data growth, more stringent requirements for recovery time objectives and recovery point objectives, and a reduction in operational staff to manage it all. Disk-assisted data protection can accelerate backup and recovery performance and data deduplication, and can make the economics of implementing disk-to-disk backup more feasible.

DETAILED DESCRIPTION

Figure 1:
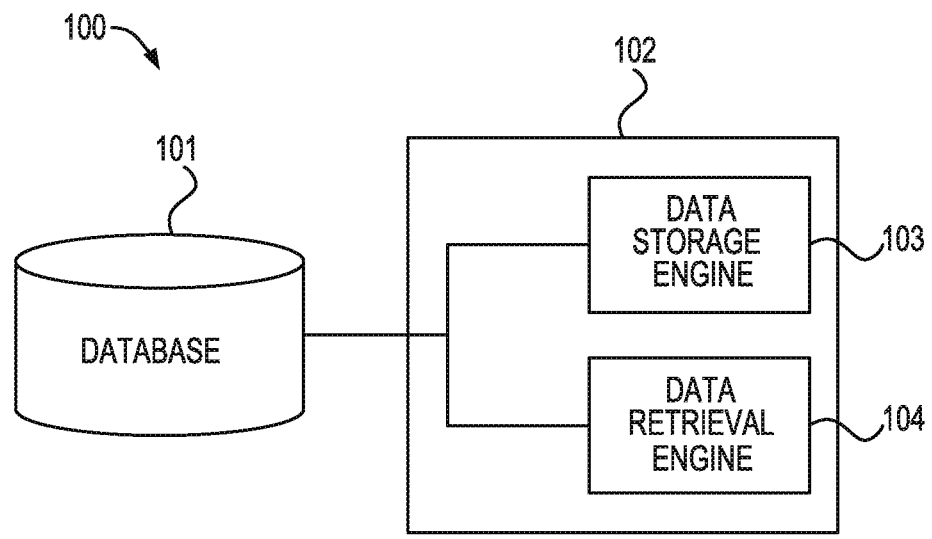
FIG. 1 illustrates a diagram of an example of a system for storing and retrieving ciphertext in data storage according to the present disclosure.

Data deduplication is an important technology in data storage solutions in order to decrease the total amount of disk space required to store a certain amount of data. As an example, consider 1000 personal computers all backing up their operating system(s) (OS). Instead of keeping 1000 copies of the data corresponding to the OS, a deduplication algorithm would ensure that the backup server retains only one physical copy, although 1000 clients would effectively believe that the retained copy is private to them. That is, deduplication refers to the process of identifying and eliminating redundancies in data storage.

Methods applied for deduplication vary; one method used involves segmenting data into multiple (fixed or variable size) segments (e.g., hereinafter referred to as chunks or data chunks). Thereafter, various methods can be employed to ensure that only one copy of each unique chunk is saved in the data storage system. By saving only the unique chunks (e.g., those chunks including data different from the data included in other chunks) the data storage system can use orders of magnitude less storage to store any given amount of data.

In a client-server data storage solution (e.g., a distributed application structure that partitions tasks or workloads between the providers of a resource or service, called servers, and service requesters, called clients), a server is semi-trusted. The server can store a clients data reliably, (e.g., with an auditing mechanism) but the client may desire to protect the data with a method such as encryption before storing it. Deduplication for data in plaintext can significantly save storage space in a data storage system. However, deduplication exploits identical content (e.g., requires identification of at least two identical chunks), while encryption attempts to make all content appear random. That is, the same content encrypted with two different keys results in very different ciphertext (e.g., encrypted data). As such, current mechanisms do not allow for deduplication of ciphertext while maintaining the security of the ciphertext.

Some mechanisms to deduplicate data include the use of a convergent encryption key. Convergent encryption uses a function of the hash of the plaintext of a chunk as an encryption key. Therefore, any client encrypting a given chunk will use the same key to do so, so identical plaintext values will encrypt to identical ciphertext values, regardless of who encrypts them. Convergent encryption, however, is only secure if the data chunk has high entropy (e.g., a high measure of uncertainty in the expected value of the information contained in a message). Further, current encryption algorithms require each encryption operation involve a unique initial value. Therefore, two ciphertexts from different encryption operations with the same plaintext and under the same key are distinct, which makes deduplication with such mechanisms infeasible.

In contrast, storing and retrieving ciphertext in data storage in accordance with examples of the present disclosure allows a server to deduplicate ciphertext and also allows a client to check integrity of both the plaintext and ciphertext. Examples of the present disclosure provide solutions other than convergent encryption, which can leak less information of the plaintext and provide stronger integrity checking capabilities.

Figure 2:
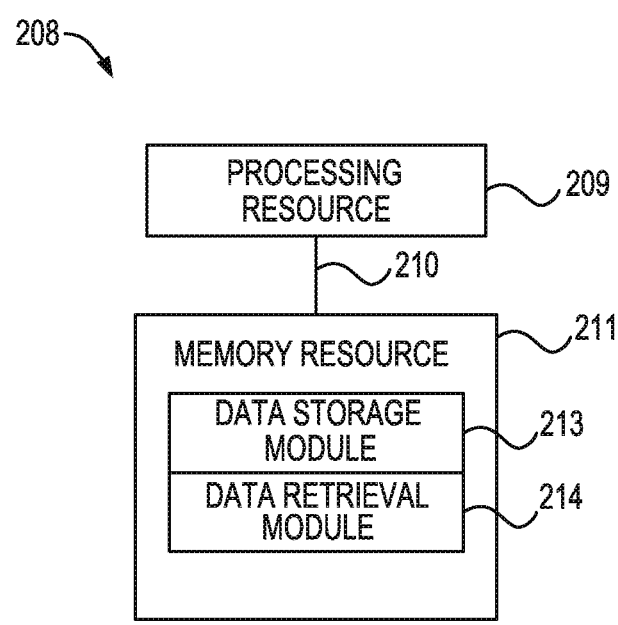
FIG. 2 illustrates a diagram of an example computing device according to the present disclosure.

FIGS. 1 and 2 illustrate examples of systems 100, 208 according to the present disclosure. FIG. 1 illustrates a diagram of an example of a system 100 for storing and retrieving ciphertext in data storage according to the present disclosure. The system 100 can include a database 101, a deduplication system 102, and/or a number of engines 103, 104. The deduplication system 102 can be in communication with the database 101 and/or a stream application programming interface (API) via a communication link. Further, the deduplication system 102 can include the number of engines (e.g., data storage engine 103 and data retrieval engine 104). The deduplication system 102 can include additional or fewer engines than illustrated to perform the various functions described herein.

The number of engines 103, 104 can include a combination of hardware and programming that is configured to perform a number of functions described herein (e.g., determine a first ciphertext value for a first data chunk to be saved to a client-server data storage system). The programming can include program instructions (e.g., software, firmware, etc.) stored in a memory resource (e.g., computer readable medium (CRM), machine readable medium (MRM), etc.) as well as hard-wired program (e.g., logic).

The data storage engine 103 can include hardware and/or a combination of hardware and programming to perform a number of functions enabling the deduplication system to store data in a server within a client-server data storage system. As used herein, a client-server data storage system is a distributed application structure that partitions tasks or workloads between the providers of a resource or service (e.g., servers) and service requesters (e.g., clients). Clients and servers can communicate over a computer network on separate hardware, and/or both client and server may reside in the same system. A server can host one or more server programs which share their resources with clients. A client can request a server's content and/or service function. Therefore, a client can initiate communication sessions with servers which await incoming requests.

The data storage engine 103 can include hardware and/or a combination of hardware and programming to determine a first ciphertext value for a first data chunk to be saved to a client-server data storage system. As used herein, a ciphertext value refers to a value associated with ciphertext (e.g., encrypted data). For instance, the ciphertext value can include a numeric and/or alphanumeric value that identifies a particular chunk of encrypted data. Also, the data storage engine 103 can include hardware and/or a combination of hardware and programming to store the first data chunk on a server in the client-server data storage system in response to making a determination that the first ciphertext value is a unique ciphertext value. As used herein, a unique ciphertext value refers to a ciphertext value that is different from any other ciphertext values stored in the client-server data storage system.

In some examples, the data storage engine 103 can include hardware and/or a combination of hardware and programming to determine a first ciphertext value using a concatenation (e.g., an operation that links together at least two consecutive series) of a second ciphertext value for the first data chunk and a message authentication code (MAC) value for the first data chunk. As used herein MAC refers to a model (e.g., an algorithm) that accepts as input a secret key and an arbitrary-length message to be authenticated, and outputs a MAC value.

The data retrieval engine 104 can include hardware and/or a combination of hardware and programming to perform a number of functions enabling the deduplication system to retrieve data from a server within a client-server data storage system. In some examples, the data retrieval engine 104 can perform functions to retrieve data from the server in response to receiving a request from a client for access to the data to be retrieved. As described further in relation to FIGS. 3-5, the data retrieval engine 104 can include hardware and/or a combination of hardware and programming to decrypt a ciphertext value for a second data chunk received from a client in the client-server data storage system.

Further, the data retrieval engine 104 can include hardware and/or a combination of hardware and programming to send a second data chunk to the client in response to making a determination that the decrypted ciphertext value corresponds to an original data chunk saved to the server by the client. As used herein, an original data chunk refers to a data chunk saved to the server by the client at a prior point in time. As described further in relation to FIGS. 3-5, making a determination that the decrypted ciphertext value corresponds to an original data chunk saved to the server by the client includes making a determination that the decrypted ciphertext value is the same as a hash value corresponding to the second data chunk.

The data retrieval engine 104 can include hardware and/or a combination of hardware and programming to determine a MAC value for the second data chunk using an encryption key for a MAC operation (e.g., a MAC model and/or MAC algorithm) and a concatenation of an encrypted chunk hash for the second data chunk and the ciphertext value for the second data chunk. In some examples, making a determination that the decrypted ciphertext value corresponds to an original data chunk saved to the server by the client can include making a determination that the MAC value for the second data chunk is the same as a MAC value determined for the original data chunk.

FIG. 2 illustrates a diagram of an example computing device 208 according to the present disclosure. The computing device 208 can utilize software, hardware, firmware, and/or logic to perform a number of functions described herein. The computing device 208 can be any combination of hardware and program instructions configured to share information. The hardware, for example, can include a processing resource 209 and/or a memory resource 211 (e.g., CRM, MRM, database, etc.). A processing resource 209, as used herein, can include any number of processors capable of executing instructions stored by a memory resource 211. Processing resource 209 may be implemented in a single device or distributed across multiple devices. The program instructions (e.g., computer readable instructions (CRI)) can include instructions stored on the memory resource 211 and executable by the processing resource 209 to implement a desired function (e.g., determine a first ciphertext value for a first data chunk to be saved to a client-server data storage system).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules 213, 214 can include CRI that when executed by the processing resource 209 can perform a number of functions. The number of modules 213, 214 can be sub-modules of other modules. For example, the data storage module 213 and the data retrieval module 214 can be sub-modules and/or contained within the same computing device. In another example, the number of modules 213, 214 can comprise individual modules at separate and distinct locations (e.g., CRM, etc.).

Each of the number of modules 213, 214 can include instructions that when executed by the processing resource 209 can function as a corresponding engine as described herein. For example, the data storage module 213 can include instructions that when executed by the processing resource 209 can function as the data storage engine 103. In another example, the data retrieval module 214 can include instructions that when executed by the processing resource 209 can function as the data retrieval engine 104.

Figure 3:
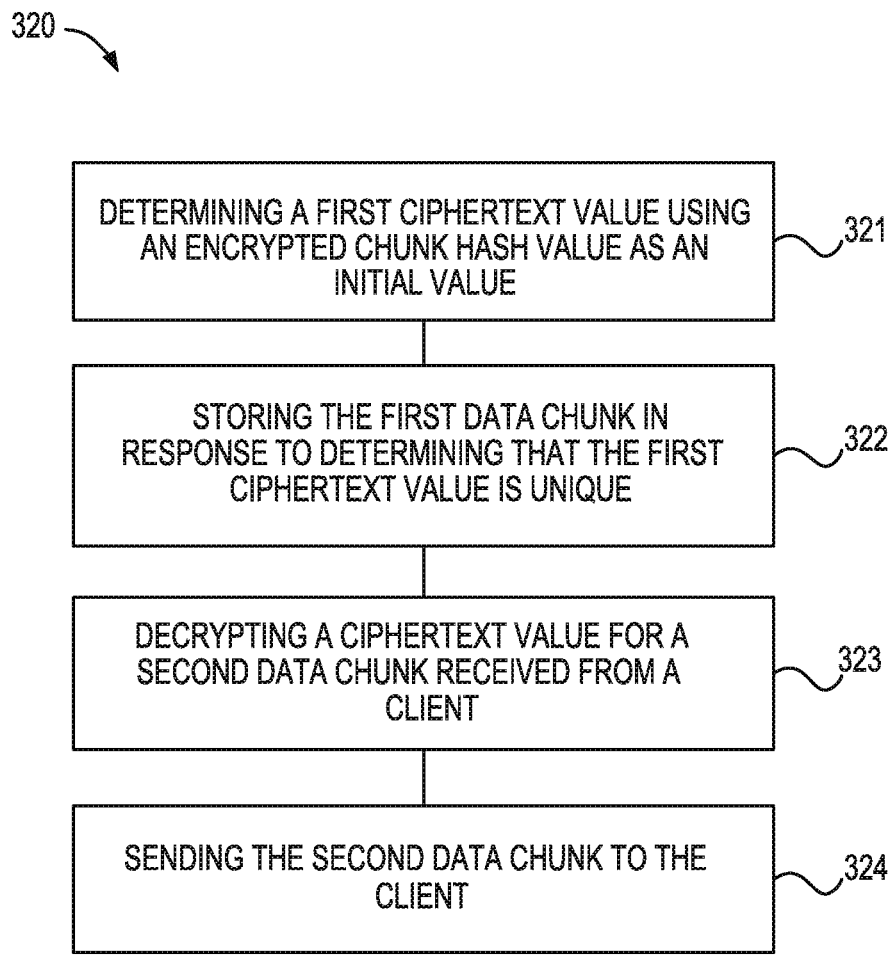
FIG. 3 illustrates a method for storing and retrieving ciphertext in data storage according to the present disclosure.
Figure 4:
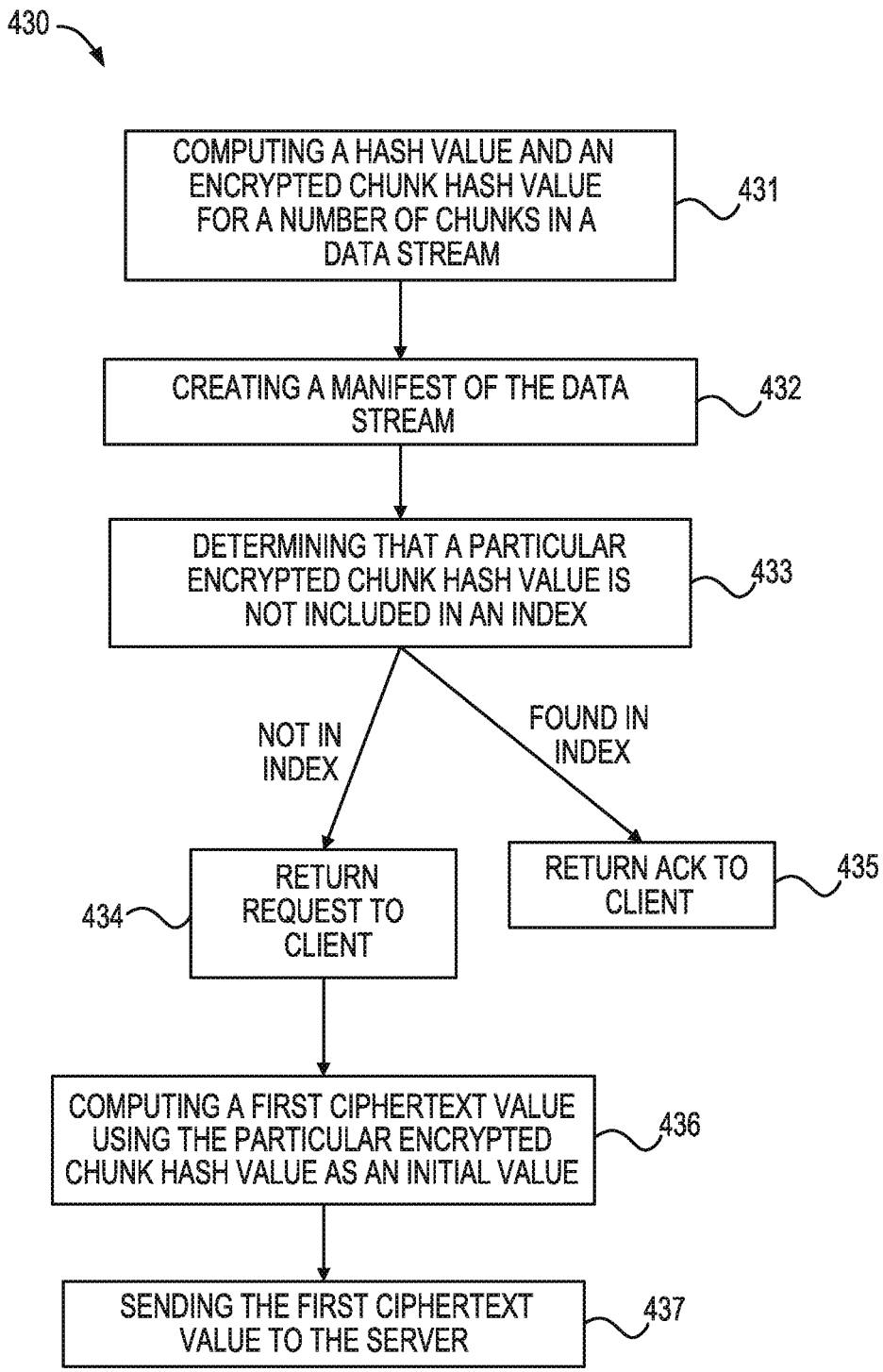
FIG. 4 illustrates a method for storing and retrieving ciphertext in data storage according to the present disclosure.
Figure 5:
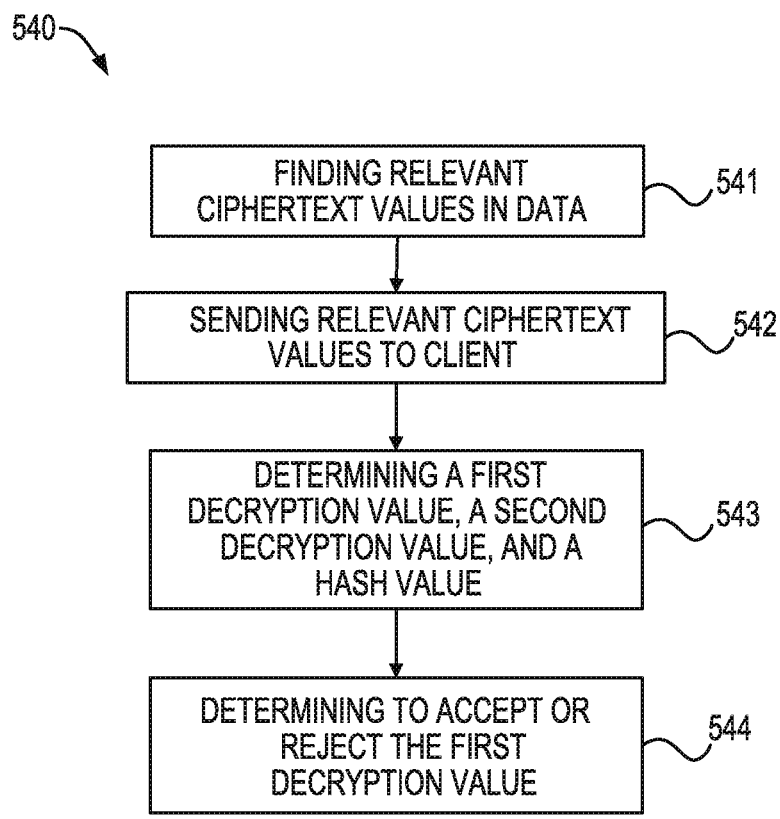
FIG. 5 illustrates a method for storing and retrieving ciphertext in data storage according to the present disclosure.

In each of the examples illustrated in FIGS. 3-5, a number of models (e.g., algorithms) can be utilized by clients in the client-server data storage system. For instance, the client may have access to the following models:

Encryption: ENC(key; initial value; plaintext)=ciphertext. The encryption model can calculate an encryption value (e.g., ciphertext) as a function of an encryption key, an initial value, and plaintext. In some cases, the initial value can be empty (e.g., zero). As used herein, plaintext refers to the information the client is sending to the server and which the client wishes to encrypt. Also, as used herein, an initial value can refer to any input of text and/or values used in executing a model.

For example, an initial value can include an encrypted chunk hash value, used in executing an encryption model.

2. Decryption: DEC(key; initial value; ciphertext)=plaintext. The decryption model can calculate a decryption value (e.g., determine plaintext) as a function of an encryption key, an initial value, and ciphertext. In some cases, the initial value can be empty (e.g., zero).

3. Hash function: HASH(datastring)=digest of the data string. The hash model can calculate a hash value of a particular data string. For example, the hash model can calculate a hash value for a particular chunk in a data stream.

4. Message authentication code: MAC(key; datastring) =MAC of the string. The MAC model can calculate a MAC value as a function of an encryption key and a data string. As used herein, a MAC value refers to a form of cryptographic hash function that protects both a message's data integrity as well as its authenticity, by allowing those who possess the encryption key to detect any changes to the message content.

Additionally, for each client in the client-server data storage system, the server can maintain two lists and correlations between them for use in storing and/or retrieving deduplicated data. First, the server can maintain a deduplication index (hereinafter referred to as the INDEX), which lists a number of encrypted data chunks. Each item in the INDEX can correlate to one encrypted data chunk. Second, the server can maintain a data list (hereinafter referred to as DATA), which lists encrypted data chunks in a deduplication format.

FIGS. 3-5 illustrate methods for storing and retrieving ciphertext in data storage according to the present disclosure. Particularly, FIG. 3 illustrates a method 320 for encryption of a single data chunk in a data stream according to the present disclosure. The method 320 can include a client-server data storage system.

At 321, the method 320 can include determining a first ciphertext value for a first data chunk to be saved to a client-server data storage system using an encrypted chunk hash value associated with the first data chunk as an initial value. In some examples, such a determination can be performed by hardware and/or a combination of hardware and programming executed by the data storage engine 103 and/or the data storage module 213. For instance; a client in the client-server data storage system may wish to save data (e.g., a data chunk) to a server. In order to store a single data chunk, the client can execute the following models:

(1) A=HASH(X), and (2) B=ENC(K; empty; A)

That is, the client can compute a hash value (A) for the data chunk (X), as well as an encrypted chunk hash value (B) for the data chunk. As used herein, K refers to an encryption key. As used herein, an encryption key refers to a piece of information (e.g., a parameter) that determines the functional output of a cryptographic model or cipher. That is, an encryption key specifies a particular transformation of plaintext into ciphertext, or vice versa during decryption. Each client in the client-server data storage system can maintain a number of encryption keys. Further, each client can pick particular encryption keys, or such encryption keys can be assigned. In some examples, clients can prefer to use a unique encryption key that is different from any other client's encryption key. However, examples are not so limited, and some clients can choose to share their encryption key, such as, if they are working on a collaborative project with other clients in the client-server data storage system.

In response to determining the value B listed in (2) above, the client can send the value B to the server. In response to receiving the value B from the client, the server can determine if the value B is stored in the INDEX. If B is in the server's INDEX, the server can return an acknowledgement (ACK) message back to the client. If B is not in the server's INDEX; the server can return a data chunk request (RES) to the client. That is, the server can determine that the particular encrypted chunk hash value (e.g., value B) is not the same as an item stored in the INDEX.

Upon receipt of a RES, the client can execute the following model:

(3) Y=ENC(K; B; X)

That is, the client can determine (e.g., calculate) a ciphertext value as a function of a K (e.g., key), the value B determined in (2) above, and plaintext from the particular data chunk (X). The resulting value Y (e.g., ciphertext) can be sent to the server.

At 322, the method 320 can include storing the first data chunk in response to determining that the first ciphertext value is unique. As described in relation to models (1)-(3), the server can determine that value B is or is not stored in the INDEX. In response to determining that B is not in the INDEX, the client can determine Y as described in model (3). In response to receiving Y, the server can store B in the INDEX, store Y in DATA, and send the client an acknowledgement (ACK). Therefore, the server can store the encrypted chunk hash value (B) and the ciphertext value (Y) determined in models (2) and (3), respectively, in response to determining that B was not previously stored in the INDEX. That is, the ciphertext value Y can be a unique ciphertext value in DATA.

At 323, the method 320 can include decrypting a ciphertext value for a second data chunk received from a client. In some examples, such decrypting can be performed by hardware and/or a combination of hardware and programming executed by the data retrieval engine 103 and/or the data storage module 213. As used herein, the nomenclature "first" and "second" may not refer to a first in time and a second in time. That is, decrypting a ciphertext value for a "second data chunk" can be performed prior to determining a first ciphertext value for a "first data chunk". Similarly, a "first" and "second" of something can in some instances refer to the same item. For example, the "first data chunk" referred to in 321 of method 320 can be the same as the "second data chunk" referred to in 323 of method 320.

Decrypting a ciphertext value for a second data chunk received from a client can in some instances be performed in response to a server receiving a request from a client for access to a particular data chunk in the client-server data storage system. In response to receiving a request from the client to retrieve a particular data chunk, the method 320 can include the server finding (e.g., identifying and/or locating) a relevant B from the INDEX and Y from DATA. That is, the server can identify a B from the INDEX and a Y from DATA that correspond to the data chunk requested by the client. The server can perform a lookup of the INDEX and DATA to identify such values, and/or any other method for finding relevant B and Y values. In response to identifying relevant B and Y values, the server can send them back to the client. In response to receiving the relevant B and Y values, the client can execute the following models:

(4) X'=DEC(K; B; Y), (5) A'=DEC (K; empty; B), (6) A''=HASH(X')

That is, in (4), the client can execute a decryption model to determine (e.g., calculate) a first decryption value (X) for the data chunk as a function of an encryption key (K) provided by the client, the relevant encrypted chunk hash value found in the INDEX (B), and the relevant ciphertext value found in DATA (Y). Similarly, in (5), the client can execute a decryption model to determine a second decryption value (A') using the encryption key provided (K), and the relevant encrypted chunk hash value found in the INDEX (B). As indicated in (5) above, the initial value used in the model is left empty (e.g., no value is entered as an initial value). Also, in (6), the client can calculate a hash value (A") of the first decryption value (X'), determined in (4) above.

At 324, the method 320 can include sending the second data chunk to the client. The client can retrieve the second data chunk (e.g., the server can send the requested data chunk to the client) in response to the client determining to accept or reject a decryption value. For example, in response to determining (4)-(6) above, the client in the client-server data storage system can determine to accept or reject the first decryption value (X') determined in (4), based on the calculated hash value (A") and the second decryption value (A'). That is, the client can determine if X' correlates with the original data chunk (X) which the client intended to retrieve. In some examples, determining to accept or reject the first decryption value (X') includes determining if A' is equal to A". If A' is equal to A', then the client can accept X' as the original X and therefore retrieve the requested data chunk. If A' is not equal to A", then the client can reject it and the request can be terminated.

FIG. 4 illustrates a method 430 for storing and retrieving ciphertext in data storage according to the present disclosure. Particularly. FIG. 4 illustrates a method 430 of storing a data stream with multiple chunks according to the present disclosure. As described in relation to FIG. 3, the method 430 can be performed by hardware and/or a combination of hardware and programming executed by the data storage engine 103 and/or the data storage module 213. At 431, the method 430 can include determining (e.g., calculating) a hash value and an encryption value for a data stream. For example, in order to store a data stream with a number (n) of chunks, say X=(X1, X2, . . . , Xn), the client can execute the following models:

For i=1 to n, compute:
(7) Ai=HASH(Xi) and
(8) Bi=ENC(K; empty; Ai).

That is, in (7), the client can determine a hash value (Ai) for each of the number of data chunks in the data stream, as a function of plaintext (Xi) of the particular data chunk). Similarly, in (8), the client can determine an encrypted chunk hash value (Bi) for each of the number of chunks in the data stream, as a function of an encryption key (K) provided by the client, and the hash value determined in (7).

At 432, the method 430 can include creating a manifest of the data stream. As used herein, a manifest refers to an ordered list of chunk hashes. That is, a manifest is effectively a logical representation of a data stream. In accordance with examples of the present disclosure, chunk hashes included in a typical manifest are replaced with an encrypted version of the chunk hash. Therefore, an ordered list of encrypted chunk hashes (the B value discussed in relation to FIG. 3), is used as a manifest, which is effectively a logical representation of a data stream preserving data confidentiality.

In response to the client creating a manifest of the data stream, the client can send the manifest to the server. In response to receiving the manifest from the client, at 433, the method 430 can include determining that a particular encrypted chunk hash value is not included in an index. For example, the server can check each Bi value determined in (8) against the INDEX, and determine if any of the Bi values are not included in the INDEX. If the server determines that any Bi is not in the INDEX, at 434, the method 430 can include sending a request to the client for each missing Yi value (e.g., a ciphertext value corresponding to the particular data chunk) corresponding to the Bi values not found in the INDEX. Similarly, at 435, the method 430 can include the server sending an acknowledgement (ACK) to the client identifying that each Bi value determined in (8) was found in the INDEX.

At 436, the method 430 can include computing a first ciphertext value for the particular encrypted chunk hash value. For instance, in response to the server sending a request to the client for each missing Yi value, the client can execute the following model for each of the Bi values that were determined by the server to not be included in the INDEX:

For i=1 to n,
(9) Yi=ENC(K; Bi; Xi)

That is, the client can determine (e.g., calculate) a ciphertext value (Yi) for the particular data chunk as a function of an encryption key (K) provided by the client, the encrypted chunk hash value (Bi) for the particular data chunk, and plaintext (Xi) associated with the particular data chunk. At 437, the method 430 can include sending the first ciphertext value (Yi) to the server.

FIG. 5 illustrates a method 540 for storing and retrieving ciphertext in data storage according to the present disclosure. Particularly. FIG. 5 illustrates a method 540 of retrieving a data stream with multiple chunks according to the present disclosure. A client can send a request for retrieval of a data stream with multiple chunks X=(X1, X2, . . . , Xn), to a server. Similarly, the client can send to the server a particular manifest (B) for the data stream. At 541, the method 540 can include finding relevant ciphertext values in DATA. For example, in response to receiving a request for retrieval from the client, and the manifest (B) (e.g., the manifest for the data stream can be B=(B1, B2, . . . , Bn)) from the client, the server can identify relevant ciphertext values (Y) (e.g., the ciphertext values for the data stream can be Y=Y1, Y2, Y3, . . . , Yn) in DATA corresponding to values in the manifest. At 542, the method 540 can include sending the relevant ciphertext values (Y) to the client.

At 543, the method 540 can include the client determining a first decryption value, a second decryption value, and a hash value for each of the relevant data chunks in the data stream. For example, in response to receiving relevant ciphertext values from the server, the client can execute the following model for each of the data chunks in the data stream:

For i=1 to n,
(10) X'i=DEC(K; Bi, Yi),
(11) A'i=DEC(K; empty; Bi), and
(12) A"i=HASH(X'i)

That is, in (10), the client can determine (e.g., calculate) a decryption value (X'i) for each data chunk as a function of an encryption key (K) provided by the client, the relevant encrypted chunk hash value found in the INDEX and corresponding to the particular data chunk (Bi), and the relevant ciphertext value found in DATA corresponding to the particular data chunk (Yi). Similarly, in (11), the client can execute a decryption model to determine a second decryption value (A'i) for each data chunk in the data stream using the encryption key provided (K), and the relevant encrypted chunk hash value found in the INDEX and corresponding to the particular data chunk (Bi). As indicated in (11) above, the initial value used in the model is left empty (e.g., no value is entered as an initial value). Also, in (12), the client can calculate a hash value (A"i) of the first decryption value (Xi), determined in (10) above.

At 544, the method 540 can include determining to accept or reject the first decryption value. For example, the client can compare every A'i value determined in (11) above, against the corresponding A"i value determined in (12) (e.g., the A'i value determined for the same data chunk). That is, the client can determine if each X'i correlates with an original data chunk (X) within the data stream which the client intended to retrieve. In response to determining that every A'i is equal to A"i, the client can accept the X'i as the original Xi. In other words, the client can accept the first decryption values for each data chunk in the data stream as corresponding to data chunks in the data stream which the client intended to retrieve. In response to determining that every A'i is not equal to the client can reject X'i as the original X.

In the examples illustrated in FIGS. 3-5, a basic integrity check scheme is implemented. However, in some examples, an encrypt-then-MAC model may be executed to store and/or retrieve data chunks. In such examples, the clients encryption key (K) can include two independent parties, Ke and Km. Ke can be used for the ENC model and Km can be used for a MAC model. Similarly, two independent ciphertext (Y) values can be determined: one is the output of the ENC model and the other is the output of MAC model.

For example, the data storage engine 103 and/or the data storage module 213 can execute a MAC model to store data chunks and/or data streams from a client-server data storage system. In such an example, models (3) and/or (9) (as appropriate) can be replaced with the following model:

Given Ke, Km, B, X, compute:
(13) Z=ENC(Ke; B; X)
(14) C=MAC(Km; B∥Z),
(15) Y=Z∥C That is, in (13), the client can determine (e.g., calculate) a ciphertext value (Z) as a function of an encryption key for an encryption model (Ke) provided by the client, the encrypted chunk hash value (B) for the particular data chunk, and plaintext (X) associated with the particular data chunk. Similarly, in (14), the client can determine a MAC value (C) as a function of an encryption key for a MAC function (Km), and a concatenation of the particular encrypted chunk hash value (B) and the ciphertext value determined in (13) (Z). Also, in (15), the client can determine a ciphertext value (Y) as a concatenation of the ciphertext value determined in (13) (Z) and the MAC value determined in (14) (C).

In some examples, computing a MAC value can be performed using a keyed-hash message authentication code (HMAC) model. Similarly, in some examples, the encryption model can be executed using xor-encrypt-xor based tweaked-codebook mode with ciphertext stealing advanced encryption standard (XTS-AES), as defined in NIST Recommendation SP 800-38E by reference to IEEE Standard 1619-2007. As AES is a 128-bit block cipher, the encryption key K (or Ke) can safely be used to encrypt 264 blocks, which is 268 bytes. Lastly, any secure hash function can be used, including secure hash algorithm (SHA) functions. For example, hash functions identified in "ISO/IEC 10118-3: 2004 Information Technology—Security techniques—Hash functions—Part 3: Dedicated hash-functions" (available at http://www.iso.org/iso/catalogue detail.htm?csnumber=39876) can be used.

Similarly, in some examples, the data retrieval engine 104 and/or the data storage module 214 can execute a MAC model to retrieve data chunks and/or data streams from a client-server data storage system. In such examples, the methods 320 and 540 (illustrated in FIGS. 3 and 5, respectively) can include the following models;

Given Ke, Km, B, C (e.g., MAC value stored in the INDEX and/or DATA);
Z (e.g., ciphertext value stored in the INDEX and/or DATA), compute:
(16) C'=MAC(Km; B∥Z),
If C' is not equal to C, return ERR; otherwise compute:
(17) X'=DEC(Ke; B; Z)

That is, in (16), the client can determine (e.g., calculate) a MAC value (C') for a data chunk using an encryption key for a MAC operation (Km) and a concatenation of an encrypted chunk hash (B) for the data chunk and the ciphertext value for the data chunk (Z). In response to determining the C' value, the client can determine if the C' value corresponds to an original data chunk saved in the server by the client by determining if C' is equal to C (e.g., a ciphertext value stored in the INDEX and/or DATA0. In response to determining that C' is not equal to C, the client can send an error message (ERR) to the server. In response to determining that C' is equal to C, the client in (17) can determine a decryption value (X') as a function of an encryption key for an encryption operation (Ke), an encrypted chunk hash value (B) for the data chunk and the ciphertext value for the data chunk (Z). In such examples, there is no need to recompute:

A'=DEC(Ke; empty; B) and
A"=HASH(X'), and to check if A' is equal to A" or not because the ciphertext integrity implies the plaintext integrity.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
a processor; and
a non-transitory storage medium storing data storage instructions and data retrieval instructions, the data storage instructions executable on the processor to:
compute a first ciphertext value for a first data chunk to be saved to a storage system, the first ciphertext value computed based on encrypting information of the first data chunk using, as an initial value for encryption, an encrypted chunk hash value associated with the first data chunk, the encrypted chunk hash value encrypted using an encryption key, the computing of the first ciphertext value responsive to an indication provided as part of deduplicating ciphertext values corresponding to data chunks to be stored by a storage operation to the storage system, wherein the indication is responsive to a determination that the encrypted chunk hash value associated with the first data chunk is not stored in an index, and the deduplicating of ciphertext values avoids storing a redundant ciphertext value in the storage system in response to a determination that an encrypted chunk hash value associated with a given data chunk is stored in the index; and
provide the first ciphertext value to a server for storage in the storage system, and provide the encrypted chunk hash value for storage in the index; and
the data retrieval instructions executable on the processor to:
in response to a request from a client for the first data chunk:
receive the encrypted chunk hash value associated with the first data chunk from the index;
decrypt the first ciphertext value for the first data chunk using the received encrypted chunk hash value;
decrypt the received encrypted chunk hash value to produce a decrypted chunk hash value;
determine, using the decrypted chunk hash value, whether the decrypted first ciphertext value corresponds to the first data chunk; and
accept or reject the decrypted first ciphertext value based on the determining.

2. The system of claim 1, wherein the data storage instructions are executable on the processor to compute the first ciphertext value using a concatenation of a second ciphertext value for the first data chunk and a message authentication code (MAC) value for the first data chunk.

3. The system of claim 1, wherein, to determine that the decrypted first ciphertext value corresponds to the first data chunk, the data retrieval instructions are executable on the processor to determine that a hash of the decrypted first ciphertext value is the same as the decrypted chunk hash value.

4. The system of claim 1, wherein the data retrieval instructions are executable on the processor to determine a first message authentication code (MAC) value for the first data chunk using an encryption key for a MAC operation and a concatenation of the encrypted chunk hash value and the first ciphertext value.

5. The system of claim 4, wherein to determine that the decrypted first ciphertext value corresponds to the first data chunk, the data retrieval instructions are executable on the processor to determine whether the first MAC value is the same as a second MAC value determined based on the first data chunk.

6. The system of claim 1, wherein, in response to receiving the request for the first data chunk, the data retrieval instructions are executable on the processor to identify, from the index comprising encrypted chunk hash values for respective data chunks, the encrypted chunk hash value associated with the first data chunk.

7. The system of claim 1, wherein, in response to receiving the request for the first data chunk, the data retrieval instructions are executable on the processor to identify the first ciphertext value for the first data chunk from a list of encrypted data chunks, and return the identified first ciphertext value to the client.

8. The system of claim 1, wherein the data storage instructions are executable on the processor to:
create a manifest as part of the storage operation to store the data chunks to the storage system, the manifest comprising encrypted chunk hash values corresponding to the data chunks.

9. The system of claim 1, wherein the data storage instructions are executable on the processor to cause, as part of the storage operation, storing of at least a subset of ciphertext values corresponding to the data chunks in the storage system.

10. The system of claim 1, wherein the first ciphertext value is computed by an encryption of the first data chunk using the encrypted chunk hash value associated with the first data chunk and at least a portion of the encryption key.

11. The system of claim 1, wherein the encrypted chunk hash value associated with the first data chunk is based on encrypting a hash value using the encryption key, and the hash value is based on hashing the first data chunk.

12. A non-transitory computer readable medium storing instructions executable by a processing resource to cause a computer to:
cause storage of ciphertext values for data chunks in a storage system that performs deduplication of the ciphertext values using an index comprising encrypted chunk hash values for respective data chunks;
calculate a first decryption value for a first data chunk in the storage system using an encryption key, an encrypted chunk hash value as an initial value for decryption, and a ciphertext associated with the first data chunk, the encrypted chunk hash value associated with the first data chunk and based on encryption of a hash value using an encryption key;
calculate a second decryption value by decrypting the encrypted chunk hash value using the encryption key;
calculate a hash of the first decryption value to produce a calculated hash value; and
determine whether to accept or reject the first decryption value as equivalent to the first data chunk, based on comparing the calculated hash value and the second decryption value,
wherein the instructions to cause the computer to, as part of the deduplication:
determine whether the encrypted chunk hash value associated with the first data chunk is stored in the index;
in response to determining that the encrypted chunk hash value associated with the first data chunk is not stored in the index:
compute the ciphertext associated with the first data chunk by encrypting information of the first data chunk using as an initial value for encryption the encrypted chunk hash value; and store the ciphertext associated with the first data chunk in the storage system.

13. The non-transitory computer readable medium of claim 12, wherein the instructions are executable to calculate a respective first decryption value for each of a plurality of data chunks in a data stream.

14. The non-transitory computer readable medium of claim 12, wherein determining that the encrypted chunk hash value associated with the first data chunk is not stored in the index comprises a determination that the ciphertext associated with the first data chunk is not already stored in the storage system.

15. The non-transitory computer readable medium of claim 12, wherein the ciphertext is computed by an encryption of the first data chunk using the initial value for decryption and at least a portion of the encryption key.

16. A method executed by a system comprising a hardware processor, comprising:

computing a first ciphertext value for a first data chunk to be saved to a storage system, the first ciphertext value computed based on encrypting information of the first data chunk using, as an initial value for encryption, an encrypted chunk hash value associated with the first data chunk, the encrypted chunk hash value encrypted using an encryption key, the computing of the first ciphertext value responsive to an indication provided as part of deduplicating ciphertext values corresponding to data chunks to be stored by a storage operation to the storage system, wherein the indication is responsive to a determination that the encrypted chunk hash value associated with the first data chunk is not stored in an index, and the deduplicating of ciphertext values avoids storing a redundant ciphertext value in the storage system in response to a determination that an encrypted chunk hash value associated with a given data chunk is stored in the index; and providing the first ciphertext value to a server for storage in the storage system, and providing the encrypted chunk hash value for storage in the index;

in response to a request from a client for the first data chunk:

receiving the encrypted chunk hash value associated with the first data chunk from the index;

decrypting the first ciphertext value for the first data chunk using the received encrypted chunk hash value;

decrypting the received encrypted chunk hash value to produce a decrypted chunk hash value;

determining, using the decrypted chunk hash value, whether the decrypted first ciphertext value corresponds to the first data chunk; and accepting or rejecting the decrypted first ciphertext value based on the determining.

* * * * *